United States Patent
Zhao et al.

(10) Patent No.: US 12,267,237 B2
(45) Date of Patent: Apr. 1, 2025

(54) SENSOR DATA TRANSMISSION METHOD AND DEVICE

(71) Applicant: KINGFAR INTERNATIONAL INC., Beijing (CN)

(72) Inventors: Qichao Zhao, Beijing (CN); Ran Yang, Beijing (CN); Zhao Li, Beijing (CN)

(73) Assignee: KINGFAR INTERNATIONAL INC., Beijing (CN)

( * ) Notice: Subject to any disclaimer, the term of this patent is extended or adjusted under 35 U.S.C. 154(b) by 353 days.

(21) Appl. No.: 18/088,907

(22) Filed: Dec. 27, 2022

(65) Prior Publication Data

US 2024/0039844 A1  Feb. 1, 2024

(30) Foreign Application Priority Data

Jul. 29, 2022  (CN) .......................... 202210910613.3

(51) Int. Cl.
*H04L 45/74* (2022.01)
*H04L 67/12* (2022.01)

(52) U.S. Cl.
CPC .............. *H04L 45/74* (2013.01); *H04L 67/12* (2013.01)

(58) Field of Classification Search
CPC ....... H04L 45/74; H04L 67/12; H04L 69/329; Y02D 30/70
See application file for complete search history.

(56) References Cited

U.S. PATENT DOCUMENTS

| | | | |
|---|---|---|---|
| 10,873,471 B1* | 12/2020 | Johnson | G16Y 40/10 |
| 12,198,546 B1* | 1/2025 | Cheng | H04W 4/025 |
| 2010/0318641 A1* | 12/2010 | Bullard | H04L 43/16 |
| | | | 370/328 |

\* cited by examiner

*Primary Examiner* — Mansour Oveissi
(74) *Attorney, Agent, or Firm* — Cooper Legal Group, LLC

(57) ABSTRACT

Disclosed are a sensor data transmission method and a device. The method includes: a periodic signal acquisition apparatus receiving a message requesting for data packet description information from a data receiving end and reporting the data packet description information to the data receiving end, wherein the data packet description information includes: signal type information, the acquisition rate for each type of signal, and the sending rate of a data packet; receiving a data reporting request from the receiving end, and sending a data packet to the data receiving end according to the sending rate of the data packet in the data packet description information, wherein the data packet sent to the data receiving end contains a packet header portion and a load portion, the packet header portion includes a frame header field, a load length field, and a check field.

12 Claims, 3 Drawing Sheets

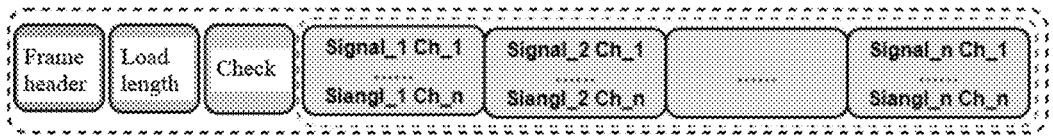

FIG. 4 receiving, by a sensor, a message requesting datarequesting for data packet description information from a data receiving end, and reporting the data packet description information to the data receiving end; the data packet description information reported includes: signal type information, the acquisition rate for each type of signal, and the sending rate of a data packet ⎯ S110 receiving a data reporting request from the data receiving end and sending the data packet to the data receiving end according to the sending rate of the data packet in the reported data packet description information based on the data reporting request, the data packet sent to the data receiving end contains a packet header portion and a load portion, the packet header portion includes a frame header field, a load length field, and a check field, a load length value in the load length field is determined according to the data length of each type of signal in the reported data packet description information, and the load portion includes sensor data corresponding to the signal type in the reported data packet description information ⎯ S120

FIG. 5

SENSOR DATA TRANSMISSION METHOD AND DEVICE

CROSS-REFERENCE TO RELATED APPLICATION

This application claims the priority and benefit of Chinese patent application No. 202210910613.3, filed on Jul. 29, 2022. The entirety of Chinese patent application No. 202210910613.3 is hereby incorporated by reference herein and made a part of this specification.

TECHNICAL FIELD

The present invention relates to the technical field of sensors, and more particularly to a sensor data transmission method and a device.

BACKGROUND ART

With the development of artificial intelligence, big data, cloud computing, 5G, and other technologies, the level of intelligence in various fields has improved, and the quality and rate of sensing and signal transmission by intelligent sensing devices have become more and more important. How to realize the optimal optimization of the reception, storage, transferring, analysis, and processing of a signal of a sensing device, reduce the redundancy, and improve the transmission efficiency is very important.

Lab Streaming Layer (LSL) protocol is a protocol for laboratory sensor data transferring. The protocol can substantially meet the performance requirements in the Ethernet transmission scenario. But in a low-power embedded system, it will be difficult to transfer data efficiently and timely due to a transmission mechanism, a transmission bandwidth, and other factors, resulting in additional waste of bandwidth resources. The LSL protocol is based on the TCP/IP protocol, which follows the communication flow of TCP/IP. As shown in FIG. 1, each layer through which the LSL protocol passes adds an additional packet header, such as a transport layer header H4, a network layer header H3, a link layer header H2, and a link layer tail T2, so that the payload rate is low; at the time of data sending, it is necessary to add an information identification header as shown in FIG. 2 layer by layer, and this portion occupies at least 20 bytes. Further, based on the existing LSL protocol, the packet length of a data packet is fixed. For different types of signals, the transmitted load portion is sent and processed according to the maximum load length; for a signal with a relatively low sampling rate, the actual load data may not reach the packet length at each sending, and is usually filled with a byte "0", and then sent, wasting bandwidth, power consumption, and time. In addition, the parsing mode of an SLS protocol data packet is to perform transceiving parsing by means of a frame header, a frame tail, or a frame header+frame tail mode, making it easy to miss a packet and reducing the transmission efficiency; further, the existing LSL protocol cannot verify whether the data of the sender and the receiver are consistent, namely, whether an error occurs during data transmission cannot be judged.

Therefore, it is one problem to be solved concerning how to provide a data transmission method for a low-power embedded system, which can effectively utilize the bandwidth to achieve efficient data transmission.

SUMMARY

The present invention proposes a sensor data transmission method and a device to solve the problems of the existing sensor data sending protocol in a laboratory so as to eliminate one or more problems in the prior art, thereby saving transmission bandwidth, improving transmission efficiency, and reducing power consumption.

One aspect of the present invention provides a sensor data transmission method including steps as follows:

a periodic signal acquisition apparatus (e.g. a sensor) receives a message requesting for data packet description information from a data receiving end, and reports the data packet description information to the data receiving end, wherein the data packet description information reported includes: signal type information, an acquisition rate for each type of signal, and a sending rate of a data packet;

the sensor receives a data reporting request from the data receiving end and sends the data packet to the data receiving end according to the sending rate of the data packet in the reported data packet description information based on the data reporting request, wherein the data packet sent to the data receiving end contains a packet header portion and a load portion, the packet header portion comprises a frame header field, a load length field, and a check field, a load length value in the load length field is determined according to a data length of each type of signal in the reported data packet description information, and the load portion comprises sensor data corresponding to a signal type in the reported data packet description information.

In some embodiments of the present invention, the method further comprises: a sensor receiving a request for stopping reporting data from the data receiving end, and stops reporting the sensor data based on the request for stopping reporting data.

In some embodiments of the present invention, the reported data packet description information further comprises channel numbers for each type of signal.

In some embodiments of the present invention, in the case where signal type information in the reported data packet description information contains multiple different signal types, the acquisition rates of each type of signal in the reported data packet description information are the same or different, the channel numbers for each type of signal are the same or different, and the sensor data corresponding to the signal type of the load portion in the data packet sent to the data receiving end is the sensor data corresponding to the channel numbers of each type of signal.

In some embodiments of the present invention, the frame header field is 1 byte; the load length field is 1 byte; the check field is 1 byte.

In some embodiments of the present invention, before reporting the data packet description information to the data receiving end, the method further comprises: the sensor detecting a signal type that can be acquired by itself, and determining signal type information in the reported data packet description information based on detected signal type.

In another aspect of the present invention, there is also provided a sensor data transmission method comprising steps as follows:

a data receiving end sends a message requesting for data packet description information to a sensor and receives the data packet description information from the sensor, and received data packet description information comprises: signal type information, an acquisition rate for each type of signal, and a sending rate of a data packet;

the data receiving end sends a data reporting request to the sensor and receives the data packet from the sensor based on the sending rate of the data packet in the data packet description information from the sensor, wherein the data packet contains therein a packet header portion and a load portion, the data packet header portion comprises a frame header field, a load length field, and a check field, a load length value in the load length field is determined according to a data length of each type of signal in the reported data packet description information, and the load portion comprises a sensor data corresponding to a signal type in the reported data packet description information.

In some embodiments of the present invention, the method further comprises a step as follows: the data receiving end parses the data packet based on the signal type information in the data packet description information from the sensor, the channel numbers for each type of signal, and the acquisition rate of each type of signal.

In another aspect of the present invention, there is also provided a sensor comprising:

- a receiving unit for receiving a message requesting for data packet description information from a data receiving end; and
- a sending unit for reporting the data packet description information to the data receiving end, wherein the data packet description information reported comprises: signal type information, an acquisition rate for each type of signal, and a sending rate of a data packet;
- wherein the receiving unit is also configured for receiving a data reporting request from the data receiving end;
- the sending unit is also configured for sending the data packet to the data receiving end according to the sending rate of the data packet in the reported data packet description information based on the data reporting request;
- wherein the data packet sent to the data receiving end contains a packet header portion and a load portion, the packet header portion comprises a frame header field, a load length field, and a check field, a load length value in the load length field is determined according to a data length of each type of signal in the reported data packet description information, and the load portion comprises sensor data corresponding to a signal type in the reported data packet description information.

In some embodiments of the present invention, the sensor further comprises: a detection module for detecting a signal type that can be acquired by itself, and determining signal type information in the reported data packet description information based on the detected signal type.

In another aspect of the present invention, there is also provided a sensor data transmission device comprising a processor and a memory, the memory having stored therein a computer instruction, and the processor being used to execute the computer instruction stored in the memory. When the computer instruction is executed by the processor, the device implements the steps of the method described previously.

The sensor data transmission method and device of the present invention can transmit data according to an agreed data packet length and format by communicating a data packet format with an adjustable length by both communication parties so that transmission bandwidth can be saved, transmission efficiency can be improved, power consumption can be reduced, and data packet check can be realized.

Additional advantages, objectives, and features of the invention will be set forth in part in the description which follows and in part will become apparent to those having ordinary skill in the art upon the examination of the following or may be learned from practice according to the present invention. The objectives and other advantages of the present invention may be realized and obtained by a structure particularly pointed out in the description and accompanying drawings.

Those skilled in the art will understand that the objectives and advantages that can be achieved by the invention are not limited to the above specific description, and the above and other objectives that can be achieved by the invention will be more clearly understood according to the following detailed description.

BRIEF DESCRIPTION OF THE DRAWINGS

The accompanying drawings described herein are intended to provide a further understanding of the present invention, constitute a part of the present application, and do not constitute a limitation of the present invention.

FIG. 4 is a schematic diagram showing the structure of a data packet according to another embodiment of the present invention.

FIG. 5 is a schematic flow diagram of a sensor data transmission method according to an embodiment of the present invention.

DETAILED DESCRIPTION

Figure 1:
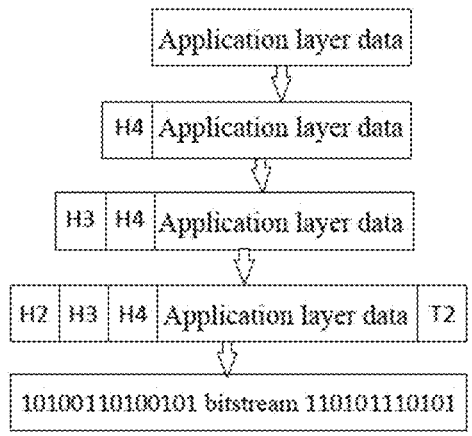
FIG. 1 is a schematic diagram showing the encapsulation of various layers of an existing LSL protocol.
Figure 2:
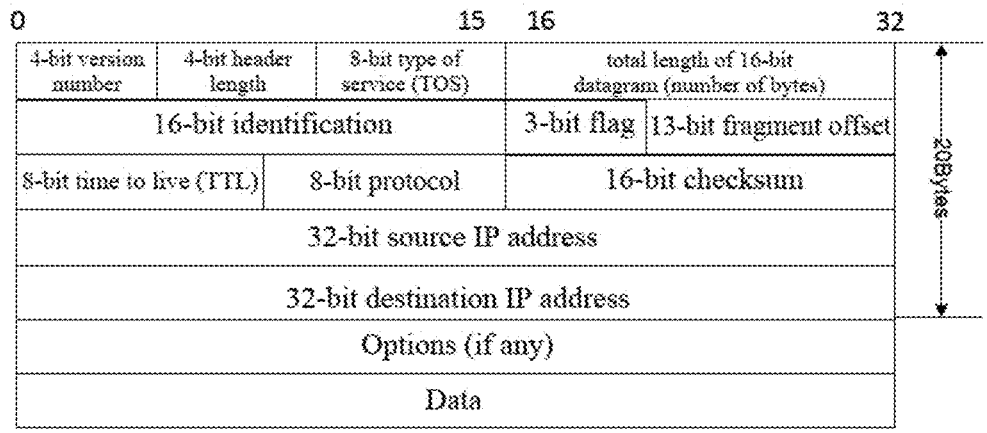
FIG. 2 is a schematic diagram showing a structure of a datagram of an existing LSL protocol.

In order to make the objective, technical schemes, and advantages of the present invention clearer, the present invention will be further described in detail below in combination with the implementation modes and accompanying drawings. Here, the schematic implementation modes of the present invention and descriptions thereof are used to explain the present invention, and are not used as a limitation of the present invention.

Here, it also needs to be noted that, in order to avoid blurring the invention due to unnecessary details, only a structure and/or processing step closely related to the schemes according to the invention is shown in the drawings, while other details that have little to do with the invention are omitted.

It should be emphasized that the term "comprises/comprising" when used herein is taken to specify the presence of a feature, an element, a step, or an assembly, and does not preclude the presence or addition of one or more other features, elements, steps, or assemblies.

It also needs to be noted herein that, unless otherwise specified, the term "connected" may refer herein not only to a direct connection, but also to an indirect connection where an intermediate is present.

At present, there are many sensor networks or sensor systems working normally based on the LSL protocol. But as previously stated, in the existing sensor data transmission technology based on the LSL protocol, the data packet length is fixed, which results in wasted bandwidth, power consumption, and time in low load transmission; the data packet parsing mode of the LSL protocol is transceiving parsing by means of a frame header, or a frame tail, or a frame header+a frame tail, making it easy to miss a packet and reducing the transmission efficiency. The data parsing mode does not have a checking function, resulting in the scenario that it is impossible to judge whether an error occurs during data transmission; in addition, for different types of sensor signals, the data format of the data packet generated by the sensor is subjected to data parsing according to the uniform bit width (the number of bits occupied by the numerical value) and the accuracy. This greatly limits the application of LSL protocol in low-power embedded systems, making it difficult to send data efficiently, timely, and safely. In response to these problems, the embodiments of the present invention provide a sensor data transmission method capable of effectively improving data transmission efficiency and reducing data transmission errors. In accordance with the method, a new data transmission protocol is provided. For the convenience of description, the new protocol can be named "Ksens" protocol below, but the scope of protection of the invention is not limited by the name.

In an embodiment of the present invention, an existing data packet structure is improved, and a data interactive process between a sensor and a data receiving end, namely, a data transmission flow of the sensor, is provided, so that sensor data can be transmitted efficiently, quickly, and safely in a low-power embedded system. In the existing LSL protocol, only physical transmission and data link are specified, and the interactive process of the sensor is not given; however, the present invention provides an interactive process based on the Ksens protocol, so that the data transmission process of the sensor can effectively save the transmission bandwidth, improve the transmission efficiency, and reduce the power consumption.

Figure 3:
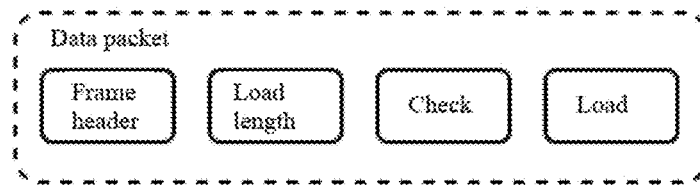
FIG. 3 is a schematic diagram showing the structure of a data packet according to an embodiment of the present invention.

FIG. 3 is a schematic diagram showing the structure of a data packet in an embodiment of the present invention. As shown in FIG. 3, the improved data packet used in data transmission according to the present invention includes a packet header portion and a load (data content) portion, wherein the packet header portion is a portion identifying the beginning of a data packet and includes: a frame header field, a load length field, and a check field.

The frame header field is used to denote different sensor types. For example, in the case where the frame header begins with 0xFC, it denotes a wearable physiological sensor, and in the case where the frame header begins with 0xFB, it denotes an EEG acquisition system.

In an embodiment of the present invention, the frame header field occupies 1 byte, the load length field occupies 1 byte, and the check field occupies 1 byte, i.e. the packet header portion occupies 3 bytes, the packet header is short, and the load rate is high.

In an alternative embodiment of the present invention, the length of the frame header and the numerical value of the frame header are adjustable and can be reasonably set based on the actual usage scenario, but the length of the packet header in the present invention can always be made smaller than the 20-byte length of the packet header portion in the existing LSL protocol.

In an embodiment of the present invention, the numerical value of the load length field is an adjustable numerical value, and the type of the numerical value can be selected from uint8/int8 (8 bit, i.e. 1 byte), uint16/int16 (16 bit, i.e. 2 bytes), uint32/int32 (32 bit, i.e. 4 bytes), uint64/int64 (64 bit, i.e. 8 bytes) or other lengths according to the length to which the load actually relates.

As shown in Table 1 below, the data type and physical unit of some sensor signals are shown. As an example, the data unit of Signal FSR (a signal representing a pressure sensor of force-sensing resistor type) is "Kg/cm$^2$", and the data type of the same is uint16 (unsigned integer 16 bit); the data unit of Signal Angle (a signal representing an angle sensor) is "°", and the data type of the same is int16 (signed integer 16 bit). The data type determines the bit width of the data, i.e. it is the number of bits occupied by the data, and both uint16 and int16 represent a length of 2 bytes.

TABLE 1

Examples of Types of Load Length Numerical Values for Different Sensor Signals

| | | Signal Type (the same as the main purpose and measurement item for distinguishing single sensor apparatuses) | | | |
|---|---|---|---|---|---|
| Signal name | Meaning | Signal type number | Unit | Unit pronunciation | Data type (Data_type) |
| SignalTest (test signal) | For testing | 0 | | | uint16 |
| SignalAngle (angle signal) | Angle | 1 | ° | X degree | int16 |
| SignalAcc (acceleration signal) | Acceleration | 2 | G | X G | int16 |
| SignalGyro (gyroscope signal) | Angular velocity | 3 | °/s | X degrees per second | int16 |
| SignalMag (magnetic signal) | Magnetic field strength | 4 | μT | X microtesla | int16 |
| SignalFSR (force-sensing resistor signal) | Single-point pressure | 5 | Kg/cm$^2$ | X kilograms per square centimeter | uint16 |
| SignalAnalog (analog sensor signal) | Analog voltage | 6 | V | Volt | int16 |
| SignalEMG (electromyographic signal) | Myoelectricity | 10 | μV | X microvolt | int16 |

TABLE 1-continued

Examples of Types of Load Length Numerical Values for Different Sensor Signals

Signal Type (the same as the main purpose and measurement item for distinguishing single sensor apparatuses)

| Signal name | Meaning | Signal type number | Unit | Unit pronunciation | Data type (Data_type) |
|---|---|---|---|---|---|
| SignalECG (Electrocardiogram signal) | ECG | 11 | μV | X microvolt | int16 |
| SignalEEG | EEG | 41 | μV | X microvolt | int24 |
| SignalDmsAlert | DMS alarm | 50 | | | uint8 |
| ... | ... | ... | ... | ... | ... |

In an embodiment of the present invention, the load length portion in the packet header can be set based on the length occupied by the actual data type of various types of sensor signals. Therefore, the numerical value of the load length is dynamically adjustable. Accordingly, since the number of bytes occupied by the load field corresponds to the numerical value of the load length, the number of bytes occupied by the data content in the load field is also dynamically adjustable.

In addition, in an embodiment of the present invention, the check value in the check field is an algorithm or a numerical value for preventing data error, and the check mode of the same may be selected from check modes such as LRC (Longitudinal Redundancy Check), BCC (Block Check Character), and CRC (Cyclic Redundancy Check). The location of the check value may be between the frame header and the length of the load or after the load, e.g. at the packet tail (the tail of the data packet, identifying a portion where the data packet ends). The location in FIG. 3 is only an example.

In an embodiment of the present invention, the load portion (load field) indicates the sensed data content portion of the data packet, i.e. the data field portion, and the content of the load field may consist of different types of signals. In the example shown in FIG. 4, each type of signal may include multiple channel signals, e.g. each type of signal in the load includes data from the first channel to the $n^{th}$ channel. Although each kind of signal in an example shown in FIG. 4 contains n channels, in practical applications, the sampling rates, the number of channels, and the data type of different types of signals may be the same or different. That is to say, each kind of signal in the data field of FIG. 4 may contain multiple signals corresponding to different channel numbers.

Based on the data packet structures shown in FIGS. 3 and 4, in an embodiment of the present invention, the data packet length (packet length) is dynamically adjustable. An application scenario of the dynamic adjustment of packet length may include, for example, the case where: for some sensors, if more signals can be acquired by collocating lead wires and expansion modules, in this case, the acquired signals comprise multiple kinds, each signal possibly having one or more channels, whereby the load field of a data packet may comprise the data of multiple different signals. However, if the lead wire and the extension module are not connected, some basic data of their own can be acquired. In this case, the signal acquired by the sensor may contain fewer signal types, and accordingly, the load field of the data packet may include the data of fewer types of signals.

For example, a certain sensor may acquire attitude data, and after connecting to an electrode wire that measures the temperature, both the attitude and the temperature may be acquired at the same time. When the sensor is not inserted with the electrode wire for temperature measurement, only the attitude data can be acquired and reported; when the electrode wire measuring the temperature is correctly connected, the attitude and temperature data can be simultaneously acquired and reported through the data packet. At this time, the structure of the data packet may be such configured that the load field includes two different signals of the attitude and the temperature.

The structure of the data packet as shown in FIGS. 3 and 4 above is merely an example. In an embodiment of the present invention, it is also possible to add other customized data fields in the data packet, and these data fields may be of a fixed length or a dynamically adjusted length. In addition, the position or order of the added other data fields may be fixed or set flexibly.

FIG. 5 is a schematic flow diagram of a sensor data transmission method according to an embodiment of the present invention. As shown in FIG. 5, the method comprises the following steps:

step S110, a data receiving end negotiating data packet description information with a sensor, that is, the content format of a data packet is determined, wherein the data packet description information may include: signal type, acquisition rate for each signal, and the sending rate of the data packet.

As an example, the signal type may be represented with a signal type coding as shown in Table 1. In an embodiment of the present invention, a corresponding relationship between different signal types and data types (data length) can be pre-stored at both the data receiving end and the sensor end so that after receiving the data packet description information reported from the sensor, the length value of the load in the data packet to be transmitted can be determined based on the signal type in the data packet description information.

In an embodiment of the present invention, the sensor is a device for sensing, obtaining the measurement data, and transmitting the measurement data, such as a pressure sensor, an acceleration sensor, a gyroscope sensor, an ECG sensor, an EMG sensor, an angular velocity sensor, a pulse sensor, and the like. The present invention is not limited to this. The data receiving end is a device for receiving and collecting the sensed data from the sensor, such as the upper computer, but the present invention is not limited thereto.

Figure 6:
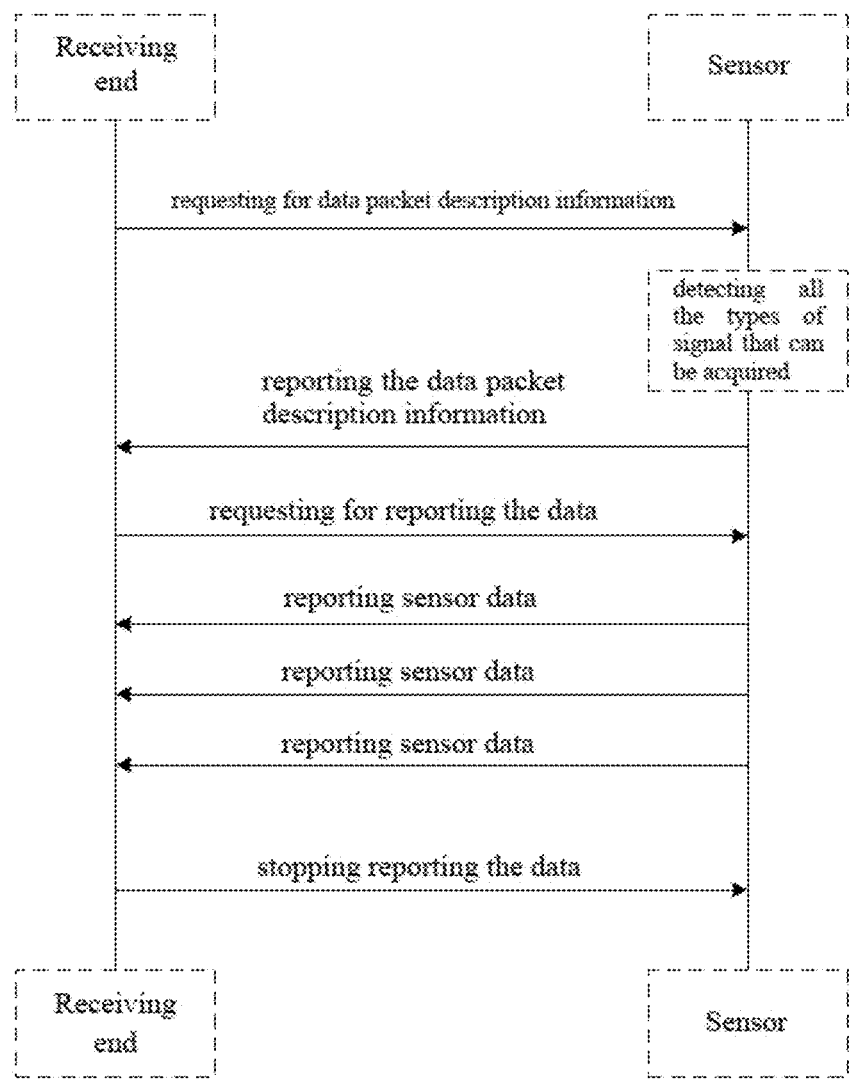
FIG. 6 is a schematic flow diagram showing an interaction between a data receiving end and a sensor according to an embodiment of the present invention.

In this step, as an example, as shown in FIG. 6, the process of negotiating data packet description information may include steps as follows:

the data receiving end sends a data packet description information request to the sensor so as to request the data packet description information; after receiving the request, the sensor reports the data packet description information to the data receiving end, wherein the reported data packet description information comprises all signal types which can be normally acquired by the sensor, the acquisition rate of each type of signal, and the sending rate of the data packet. Therefore, when the subsequent sensor transmits the sensed data, the data packet can be sent according to the communicated data packet format and the rate, and the data receiving end can receive and parse the data packet according to the communicated data packet format and rate.

In an alternative embodiment of the present invention, in order to determine the signal types which can be normally acquired by the sensor itself, when reporting the data packet description information to the data receiving end, it is also necessary to firstly perform a detection, namely, all the signal types which can be normally acquired by the sensor itself are detected, so as to carry the signal type information in the reported data packet description information after detecting all the signal types.

As an example, if a sensor can normally acquire the attitude data, the attitude and temperature can also be acquired simultaneously after the electrode wire that measures the temperature is connected. Each time when the upper computer serving as the data receiving end requests to start reporting data, the sensor will first detect whether the temperature electrode wire is correctly connected; if the connection is made, the data packet reported by the sensor to the upper computer contains "attitude" and "temperature" signal types; otherwise, the data reported on the upper computer only contains the "attitude".

That is to say, what information is contained in the data packet subsequently received by the upper computer is mainly determined by the "state" of the sensor itself.

When the sensor increases the types of the acquired signals through the above-mentioned lead wire, expansion module, etc., since the signal type that can be acquired increases, the packet length of the data packet needs to be dynamically adjusted. At that, when the upper computer requests the data packet format, the sensor can automatically detect and judge all the signal types that can be acquired by itself and report the same to the upper computer, and the upper computer can determine the dynamically adjusted packet length of the data packet based on the received signal type. In the transmission of a subsequent data packet, the transmitted data packet is also a data packet whose packet length is dynamically adjusted. When there is a decrease in the signal types that can be acquired by the sensor, the upper computer is informed of the packet length of the data packet in this way, and the packet length of the data packet is dynamically adjusted. In the prior art, in terms of data format, for a known specific sensor, the meaning and size of a certain portion of a data packet are agreed upon in advance and cannot be changed, so that it will be difficult to express the change information timely and effectively when the type of data acquisition needs to be expanded or the operation state changes. However, the embodiment of the present invention can quickly and dynamically adjust the size of a data packet through the negotiation between a sensor and a data receiving end so that it is possible to effectively save bandwidth and data transmission efficiency.

Further, in an alternative embodiment of the present invention, in the case where some or all types of signals in each type of signal are obtained through multi-channel acquisition, the data packet description information reported further comprises the channel numbers of each type of signal. In this way, the data packet structure is as shown in FIG. 4.

Step S120, the data receiving end sends a data reporting request to the sensor so as to request the sensor to report the sensed data of the sensor. See FIG. 6 for an illustration. After receiving the data reporting request, the sensor sends the data packet to the data receiving end according to the sending rate of the data packet in the reported data packet description information. The data packet format sent to the data receiving end is a data packet format as shown in FIG. 3 or FIG. 4 of the present invention, i.e. a packet header portion and a load portion are included. The packet header portion comprises a frame header field, a load length field, and a check field. The load length value in the load length field is determined according to the data length of each type of signal in the reported data packet description information. For example, the case where the load length value in the load length field is the sum of the data lengths of each type of signal in the reported data packet description information. The load portion in the data packet comprises the sensor data corresponding to the signal type in the reported data packet description information. For example, the case where if the acceleration signal type is reported, the load portion comprises the acceleration data sensed by the acceleration sensor.

After receiving the data packet, the data receiving end may check the data packet based on the check value in the data packet. Through the check value in the data packet, the data receiving end can judge whether an error occurs in the data transmission process, and if so, make a timely response. As an example, if the check is successful, the data packet can be parsed based on the signal type information in the data packet description information from the sensor, the channel numbers of each type of signal, the acquisition rate for each type of signal, etc. If the check is unsuccessful, the data packet may be discarded. Since the checking modes such as LRC, BCC, CRC, etc. are existing checking modes, the same will not be described in detail herein.

In an alternative embodiment of the present invention, a fixed packet header or packet trailer may be used to facilitate the identification and parsing of the data packet. The type of a numerical value can be adjusted according to the difference in signal types sensed by a specific sensor, so as to reduce the bandwidth occupied by the transmission as much as possible while ensuring accuracy.

In an embodiment of the present invention, since a check field is included in the data packet, it is possible to prevent the data receiving end from erroneously processing the received data.

Further, after receiving the test data, the method of the present invention may further comprise steps as follows: a sensor receives a request for stopping reporting data from a data receiving end, and stops reporting the sensor data based on the request for stopping reporting data. The sensor data transmission is thus completed.

It can be seen from the above that in the embodiment of the present invention, the reported sensor data type can be enabled according to needs, and the data packet length is dynamically adjusted based on whether it is enabled or not, so as to effectively use the transmission bandwidth and improve the efficiency of the acquisition, the transmission, and the analysis.

In the present invention, the communication between the data receiving end and the sensor can be agreed on a data packet format and/or length, and the data is sent according to the agreed data packet format and/or length. In addition, the packet header in the existing LSL protocol requires at least 20 bytes, while the data packet header based on the Ksens protocol of the present invention requires only 3 bytes, thereby greatly improving the load efficiency.

In an embodiment of the present invention, a variable-length data packet may be used in conjunction with fixed-order packets or fixed-length data packets to transmit different data respectively.

In addition, in an embodiment of the present invention, the numerical values of each sensor may be of the same numerical value type or may be of different numerical value types. The numerical value type can be adjusted according to the sensor to reduce the bandwidth occupied by the transmission as much as possible while ensuring accuracy.

The sensor data transmission process and the interaction process between the data receiving end and the sensor according to the present invention as described above are merely examples, and other processes or steps may also be added to the communication or some of the processes or steps may be omitted from the communication. It is within the scope of the present invention as long as it uses a dynamic length data packet to adapt to different sensor data so as to achieve quick and efficient data transmission based on the idea of the Ksens protocol of the present invention.

The sensor data transmission method according to the embodiments of the present invention is applicable to low-rate and low-bandwidth communication occasions, and can occupy a lower bandwidth and have high transmission efficiency; moreover, by using a dynamic packet length, the transmission bandwidth can be saved and the transmission time consumption and power consumption can be reduced; as no checking exists in the existing LSL protocol, the present invention can prevent the error-processing of a data packet through data check. Further, where a fixed packet header or packet trailer is employed, it may be more convenient to identify and parse the data packet.

In accordance with the above method, the present invention also provides a sensor, including: a receiving unit for receiving a message requesting for data packet description information from a data receiving end; and a sending unit for reporting the data packet description information to the data receiving end, wherein the data packet description information reported comprises signal type information, the acquisition rate for each type of signal, and the sending rate of a data packet.

The receiving unit also receives a data reporting request from the data receiving end; the sending unit also sends the data packet to the data receiving end according to the sending rate of the data packet in the reported data packet description information based on the data reporting request; wherein the data packet sent to the data receiving end contains a packet header portion and a load portion, the packet header portion comprises a frame header field, a load length field, and a check field, a load length value in the load length field is determined according to the data length of each type of signal in the reported data packet description information, and the load portion comprises sensor data corresponding to the signal type in the reported data packet description information.

In accordance with the above method, the present invention also provides a sensor data transmission device, such as a data receiving end, comprising a processor and a memory, the memory having stored therein a computer instruction, and the processor being used to execute the computer instructions stored in the memory. When the computer instruction is executed by the processor, the device implements the steps of the method executed by the data receiving end as described previously.

Those of ordinary skills in the art should appreciate that the various illustrative constituent parts, systems, and methods described in connection with the implementation modes disclosed herein can be implemented in hardware, software, or a combination of the two. Whether it is specifically implemented as hardware or software depends on the particular application and design constraint conditions of the technical schemes. Professional technicians can use different methods for each specific application to realize the described functions, but such implementations should not be considered beyond the scope of the invention. When implemented in hardware, it may be, for example, an electronic circuit, an application-specific integrated circuit (ASIC), appropriate firmware, a plug-in, a function card, etc. When implemented in software, the elements of the invention are programs or code segments that are used to execute the required tasks. The program or code segment may be stored in a machine-readable medium or transferred over a transmission medium or communication link by a data signal carried in a carrier wave.

It needs to be clarified that the present invention is not limited to the specific configurations and processes described above and shown in the drawings. A detailed description of a known method is omitted herein for the sake of brevity. In the above embodiments, several specific steps have been described and shown as examples. However, the method processes of the present invention are not limited to the specific steps described and shown, and those skilled in the art can make various changes, modifications, and additions, or change the order between the steps, after understanding the spirit of the present invention.

In the present invention, the features described and/or illustrated for one implementation mode can be used in the same way or in a similar way in one or more other implementation modes, and/or combined with the features of other implementation modes or replace the features of other implementation modes.

The above is only a preferred embodiment of the invention and is not intended to limit the invention. For those skilled in the art, the embodiments of the invention can have various changes and variations. Any modifications, equivalents, improvements, etc. that come within the spirit and principles of the present invention are intended to be included within the scope of the present invention.

What is claimed is:

1. A sensor data transmission method, comprising:
receiving, by a sensor, a message requesting for data packet description information from a data receiving end, and reporting the data packet description information to the data receiving end, wherein the data packet description information comprises: signal type information, an acquisition rate for each type of signal, and a sending rate of a data packet; and
receiving, by the sensor, a data reporting request from the data receiving end and sending the data packet to the data receiving end according to the sending rate of the data packet in the reported data packet description information based on the data reporting request, wherein the data packet sent to the data receiving end contains a packet header portion and a load portion, the packet header portion comprises a frame header field, a load length field, and a check field, a load length value in the load length field is determined according to a data length of each type of signal in the reported data packet description information, and the load portion comprises sensor data corresponding to a signal type in the reported data packet description information.

2. The method of claim 1, further comprising:
receiving, by the sensor, a request for stopping reporting data from the data receiving end, and stopping reporting the sensor data based on the request for stopping reporting data.

3. The method of claim 1, wherein the reported data packet description information further comprises channel numbers for each type of signal.

4. The method of claim 3, wherein in a case where signal type information in the reported data packet description information contains multiple different signal types, the acquisition rates in the reported data packet description information are the same or different for each type of signal, the channel numbers are the same or different for each type of signal, and the sensor data corresponding to the signal type of the load portion in the data packet sent to the data receiving end is sensor data corresponding to the channel numbers of each type of signal.

5. The method of claim 1, wherein
the frame header field is 1 byte;
the load length field is 1 byte;
the check field is 1 byte.

6. The method of claim 1, wherein before reporting the data packet description information to the data receiving end, the method further comprises:
detecting, by the sensor, a type of a signal that the sensor is configured to acquire, and determining signal type information in the reported data packet description information based on a detected signal type.

7. A sensor data transmission method, comprising:
sending, by a data receiving end, a message requesting for data packet description information to a sensor, and receiving the data packet description information from the sensor, wherein, the received data packet description information comprises: signal type information, an acquisition rate for each type of signal, and a sending rate of a data packet; and
sending, by the data receiving end, a data reporting request to the sensor, and receiving the data packet from the sensor based on the sending rate of the data packet in the data packet description information from the sensor, wherein the data packet contains a packet header portion and a load portion, the packet header portion comprises a frame header field, a load length field, and a check field, a load length value in the load length field is determined according to a data length of each type of signal in the data packet description information, and the load portion comprises sensor data corresponding to a signal type in the data packet description information.

8. The method of claim 7, wherein the data packet description information further comprises channel numbers for each type of signal.

9. The method of claim 8, further comprising:
parsing, by the data receiving end, the data packet based on the signal type information in the data packet description information from the sensor, the channel numbers for each type of signal, and the acquisition rate of each type of signal.

10. A sensor, comprising:
a receiving unit for receiving a message requesting for data packet description information from a data receiving end; and
a sending unit for reporting the data packet description information to the data receiving end, wherein the reported data packet description information comprises: signal type information, an acquisition rate for each type of signal, and a sending rate of a data packet;
wherein the receiving unit is further configured for receiving a data reporting request from the data receiving end;
the sending unit is further configured for sending the data packet to the data receiving end according to the sending rate of the data packet in the reported data packet description information based on the data reporting request;
wherein the data packet sent to the data receiving end contains a packet header portion and a load portion, the packet header portion comprises a frame header field, a load length field, and a check field, a load length value in the load length field is determined according to a data length of each type of signal in the reported data packet description information, and the load portion comprises sensor data corresponding to a signal type in the reported data packet description information.

11. The sensor of claim 10, further comprising:
a detection module for detecting a type of a signal that the sensor is configured to acquire, and determining the signal type information in the reported data packet description information based on a detected signal type.

12. A sensor data transmission device, comprising: a processor and a memory with a computer instruction stored thereon, wherein, the processor is configured to execute the computer instruction to implement the method according to claim 7.

* * * * *